United States Patent
Seo et al.

(10) Patent No.: US 9,832,665 B2
(45) Date of Patent: Nov. 28, 2017

(54) METHOD FOR SENDING AND RECEIVING SIGNALS FOR ALLEVIATING INTER-CELL INTERFERENCE IN A WIRELESS COMMUNICATION SYSTEM AND A DEVICE THEREFOR

(75) Inventors: Inkwon Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 409 days.

(21) Appl. No.: 14/111,999

(22) PCT Filed: Apr. 12, 2012

(86) PCT No.: PCT/KR2012/002743
§ 371 (c)(1),
(2), (4) Date: Oct. 15, 2013

(87) PCT Pub. No.: WO2012/141490
PCT Pub. Date: Oct. 18, 2012

(65) Prior Publication Data
US 2014/0036851 A1   Feb. 6, 2014

Related U.S. Application Data

(60) Provisional application No. 61/474,746, filed on Apr. 13, 2011.

(51) Int. Cl.
*H04W 24/02* (2009.01)
*H04J 11/00* (2006.01)
(Continued)

(52) U.S. Cl.
CPC .......... *H04W 24/02* (2013.01); *H04J 11/005* (2013.01); *H04W 28/20* (2013.01); *H04L 5/0048* (2013.01);
(Continued)

(58) Field of Classification Search
CPC ... H04W 24/02; H04W 28/20; H04W 72/048; H04J 11/005
See application file for complete search history.

(56) References Cited

U.S. PATENT DOCUMENTS 8,744,471 B1 * 6/2014 Cai ................ H04W 72/04
370/395.41
2008/0057996 A1 * 3/2008 Sung ................ H04W 52/146
455/522
(Continued)

FOREIGN PATENT DOCUMENTS

CN     101064865 A     10/2007
CN     101137237 A     3/2008
(Continued)

*Primary Examiner* — Walter DiVito
*Assistant Examiner* — Anthony Luo
(74) *Attorney, Agent, or Firm* — Birch, Stewart, Kolasch & Birch, LLP

(57) ABSTRACT

Disclosed is a method whereby a terminal sends and receives signals between itself and a serving cell in a wireless communication system. More specifically, the invention comprises the steps of: receiving information relating to a default bandwidth and an allocation bandwidth from the serving cell; and, if the terminal is positioned at a cell edge, either sending an uplink signal to the serving cell or receiving a downlink signal from the serving cell on the basis of the allocation bandwidth, and, here, the allocation bandwidth is either smaller than or the same as the default bandwidth.

10 Claims, 10 Drawing Sheets

(51) Int. Cl.
*H04W 28/20* (2009.01)
*H04L 5/00* (2006.01)
*H04W 72/04* (2009.01)

(52) U.S. Cl.
CPC .......... *H04L 5/0053* (2013.01); *H04L 5/0073* (2013.01); *H04W 72/048* (2013.01)

(56) References Cited

U.S. PATENT DOCUMENTS

| | | | |
|---|---|---|---|
| 2009/0186623 A1 | 7/2009 | Matsuzawa | |
| 2009/0201867 A1 | 8/2009 | Teo et al. | |
| 2009/0262692 A1* | 10/2009 | Olszewski | H04L 5/0007 370/329 |
| 2010/0029212 A1* | 2/2010 | Malladi | H04W 52/08 455/63.1 |
| 2010/0222060 A1* | 9/2010 | Zhang | H04W 36/30 455/436 |
| 2010/0285802 A1* | 11/2010 | Ahluwalia | H04W 36/0083 455/436 |
| 2010/0323688 A1* | 12/2010 | Kazmi | H04W 36/30 455/424 |
| 2011/0176497 A1* | 7/2011 | Gopalakrishnan | H04J 11/0053 370/329 |
| 2011/0255425 A1* | 10/2011 | Pikkarainen | H04W 48/08 370/252 |
| 2011/0286558 A1* | 11/2011 | Abrishamkar | H04L 25/0242 375/346 |
| 2012/0163228 A1 | 6/2012 | Sung et al. | |
| 2013/0039203 A1* | 2/2013 | Fong | H04B 7/024 370/252 |
| 2013/0094595 A1* | 4/2013 | Dimou | H04L 5/005 375/252 |

FOREIGN PATENT DOCUMENTS

| | | |
|---|---|---|
| CN | 101600212 A | 12/2009 |
| CN | 101765119 A | 6/2010 |
| KR | 10-2008-0032991 A | 4/2008 |
| KR | 10-2008-0094254 A | 10/2008 |
| KR | 10-2009-0020953 A | 2/2009 |
| WO | WO 2008/041281 A1 | 4/2008 |

* cited by examiner

FIG. 2
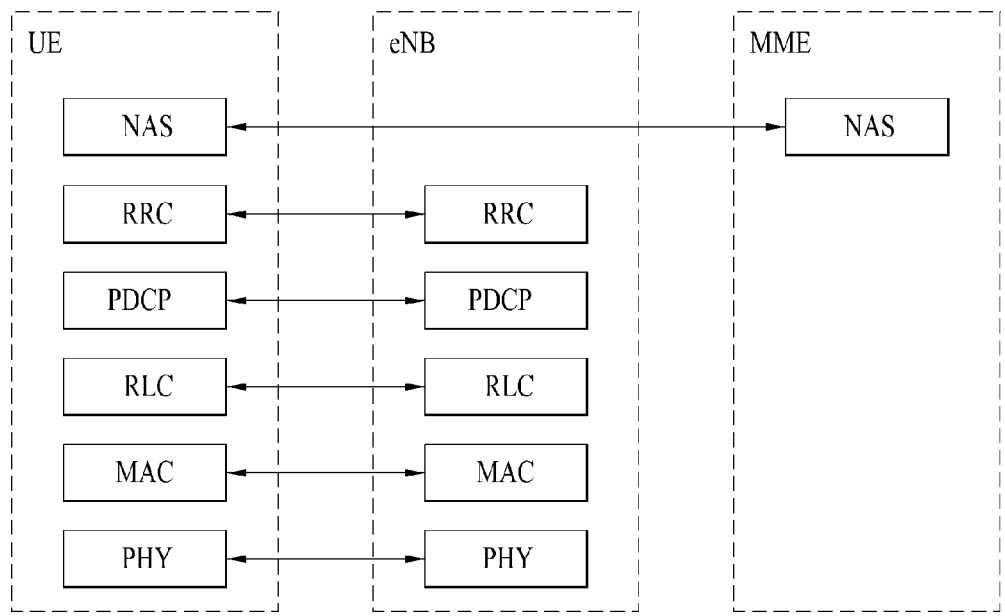
(a) Control-plane protocol stack
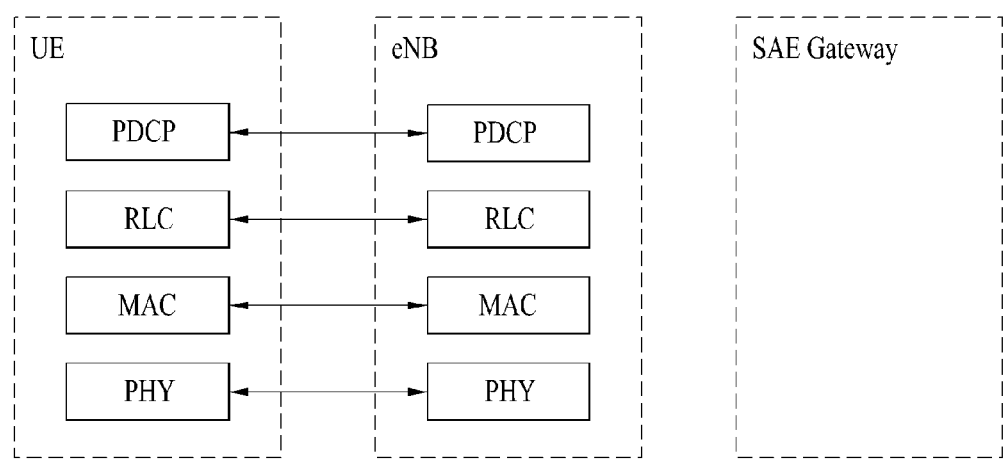
(b) User-plane protocol stack

METHOD FOR SENDING AND RECEIVING SIGNALS FOR ALLEVIATING INTER-CELL INTERFERENCE IN A WIRELESS COMMUNICATION SYSTEM AND A DEVICE THEREFOR This application is the National Phase of PCT/KR2012/002743 filed on Apr. 12, 2012, which claims priority under 35 U.S.C. 119(e) to U.S. Provisional Application No. 61/474,746 filed on Apr. 13, 2011, all of which are hereby expressly incorporated by reference into the present application.

TECHNICAL FIELD

The present invention relates to a wireless communication system, and more particularly, to a method of transceiving signals for alleviating inter-cell interference in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of transceiving signals for alleviating inter-cell interference in a wireless communication system and apparatus therefor shall be proposed in the following description.

Technical Solution

To achieve these and other advantages and in accordance with the purpose of the present invention, as embodied and broadly described, a method of transceiving a signal, which is transceived with a serving cell by a user equipment in a wireless communication system, according to one embodiment of the present invention includes the steps of receiving an information on a default bandwidth and an information on an assigned bandwidth from the serving cell and if the user equipment is located at a cell edge, transmitting an uplink signal to the serving cell based on the assigned bandwidth or receiving a downlink signal from the serving cell based on the assigned bandwidth, wherein the assigned bandwidth is equal to or smaller than the default bandwidth.

To further achieve these and other advantages and in accordance with the purpose of the present invention, as embodied and broadly described, a user equipment in a wireless communication system according to another embodiment of the present invention includes a wireless communication module configured to transceive a signal with a serving cell and a processor configured to process the signal, wherein the wireless communication module receives an information on a default bandwidth and an information on an assigned bandwidth from the serving cell, wherein if the user equipment is located at a cell edge, the processor controls the wireless communication module to transmit an uplink signal to the serving cell based on the assigned bandwidth or to receive a downlink signal from the serving cell based on the assigned bandwidth, and wherein the assigned bandwidth is equal to or smaller than the default bandwidth.

Preferably, the assigned bandwidth defines a resource for an uplink signal transmission of the user equipment located at the cell edge or a resource for a downlink signal reception of the user equipment located at the cell edge. In particular, the information on the assigned bandwidth includes an information on the number of resource block(s) and a location of the resource block(s) on a frequency.

Preferably, when the user equipment is located at a cell center, the uplink signal may be transmitted to the serving cell or the downlink signal may be received from the serving cell, using a region of the default bandwidth except the assigned bandwidth.

Preferably, at least one symbol transmitted on a control channel of a neighbor cell may be excluded from a resource for transmitting the uplink signal.

Preferably, the information on the default bandwidth may be received through an MIB (mast information block) transmitted from the serving cell and the information on the assigned bandwidth may be received through an RRC (radio resource control) layer from the serving cell. Preferably, the serving cell delivers the information on the assigned bandwidth to the neighbor cell through an X2 interface.

Advantageous Effects

According to an embodiment of the present invention, inter-cell interference occurring in a wireless communication system can be more effectively alleviated.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of a radio interface protocol between a user equipment and E-UTRAN based on 3GPP radio access network specification.

BEST MODE FOR INVENTION

Figure 1:
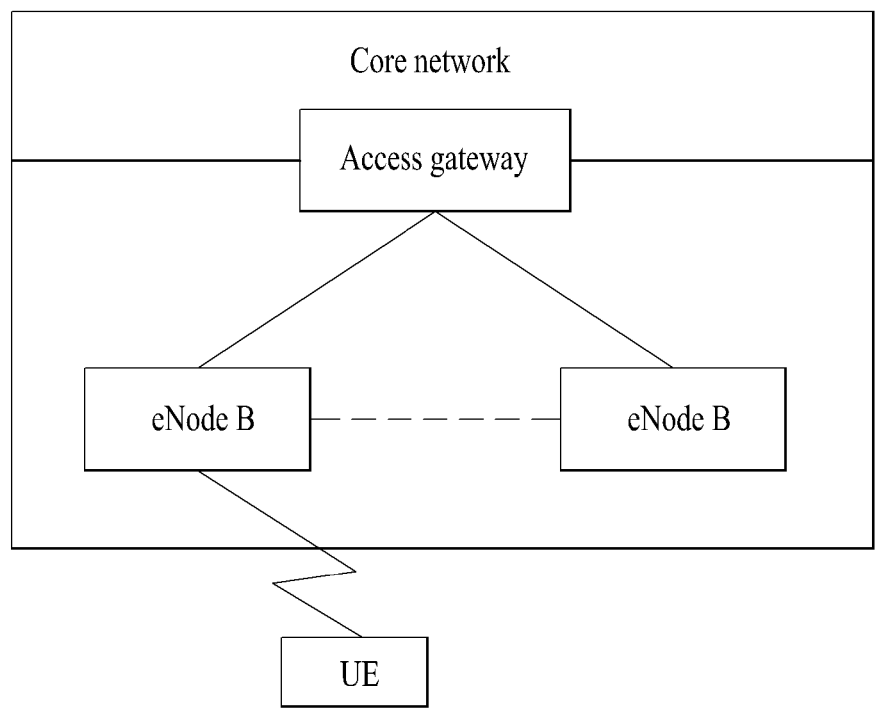
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD (frequency division duplex) scheme in the present specification, the embodiment of the present invention is easily modifiable and applicable to H-FDD or TDD (time division duplex) scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
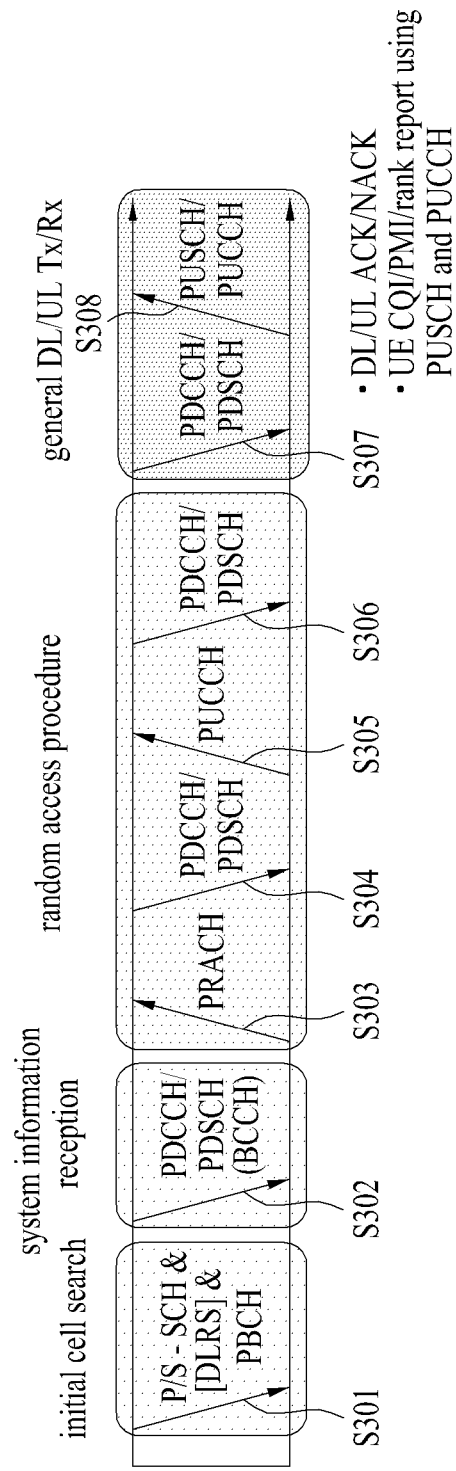
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
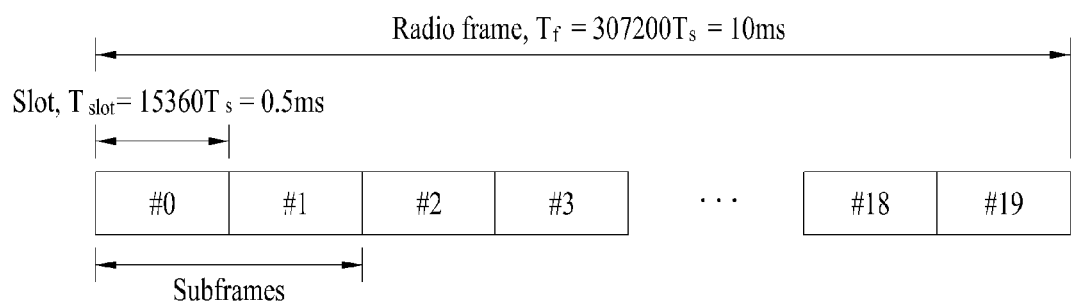
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s = 1/(15 \text{ kHz} \times 2048) = 3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
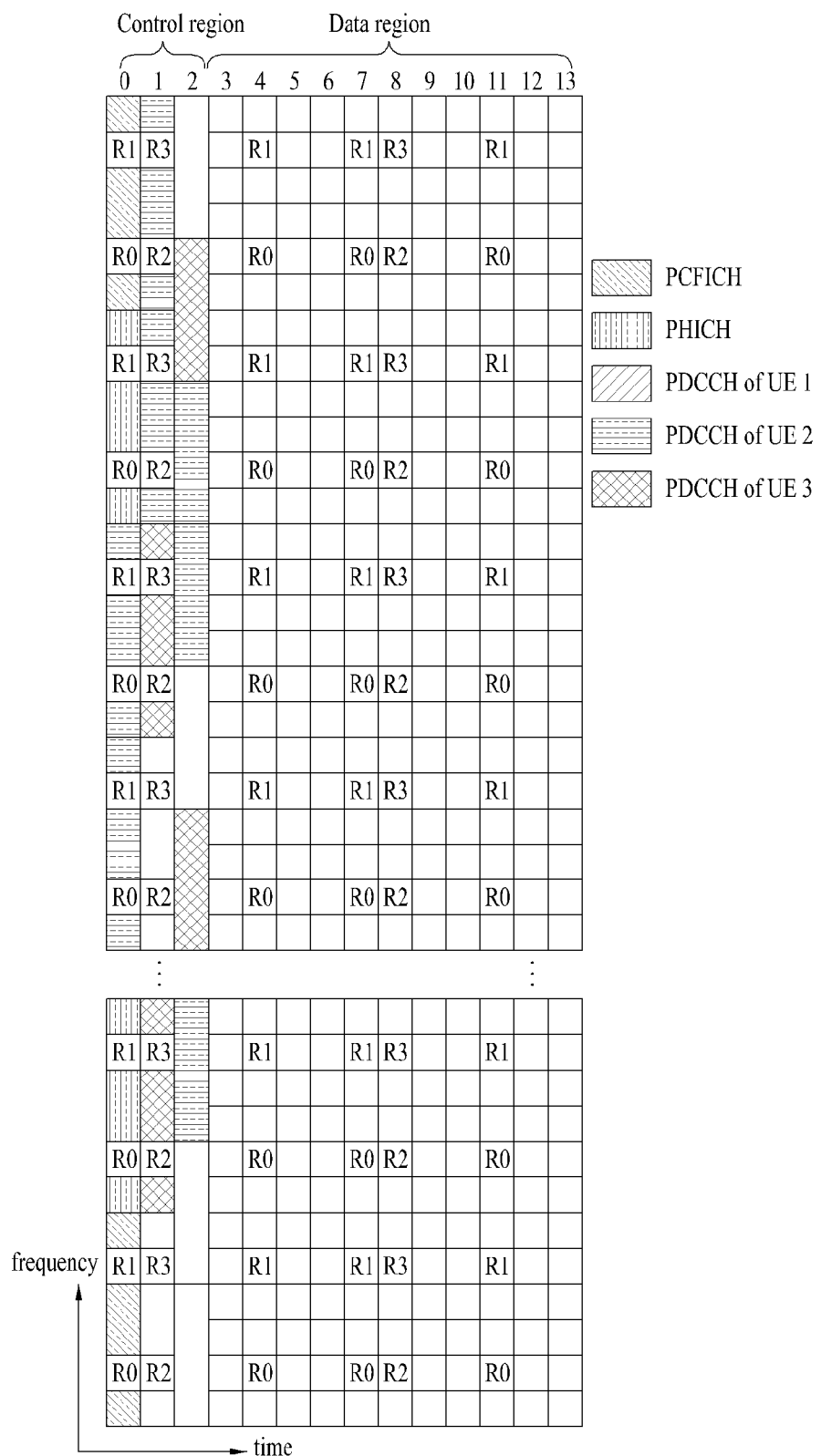
FIG. 5 is a diagram for one example of a structure of a downlink (DL) subframe used by LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
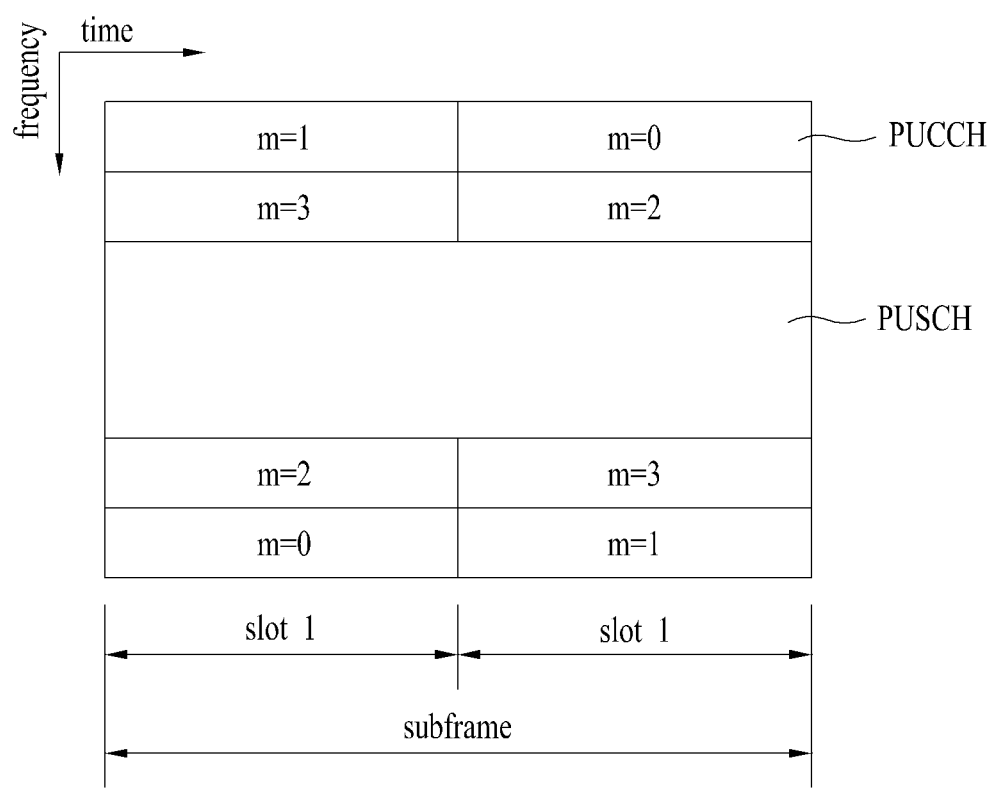
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

According to the present invention, when an uplink (hereinafter abbreviated UL) transmission and a downlink (hereinafter abbreviated DL) transmission between different cells collide with each other, a method of alleviating an inter-cell interference is proposed. And, it is apparent that the present invention is available for a general inter-cell interference as well as for an inter-cell interference due to the collision between an uplink transmission and a downlink transmission.

Figure 7:
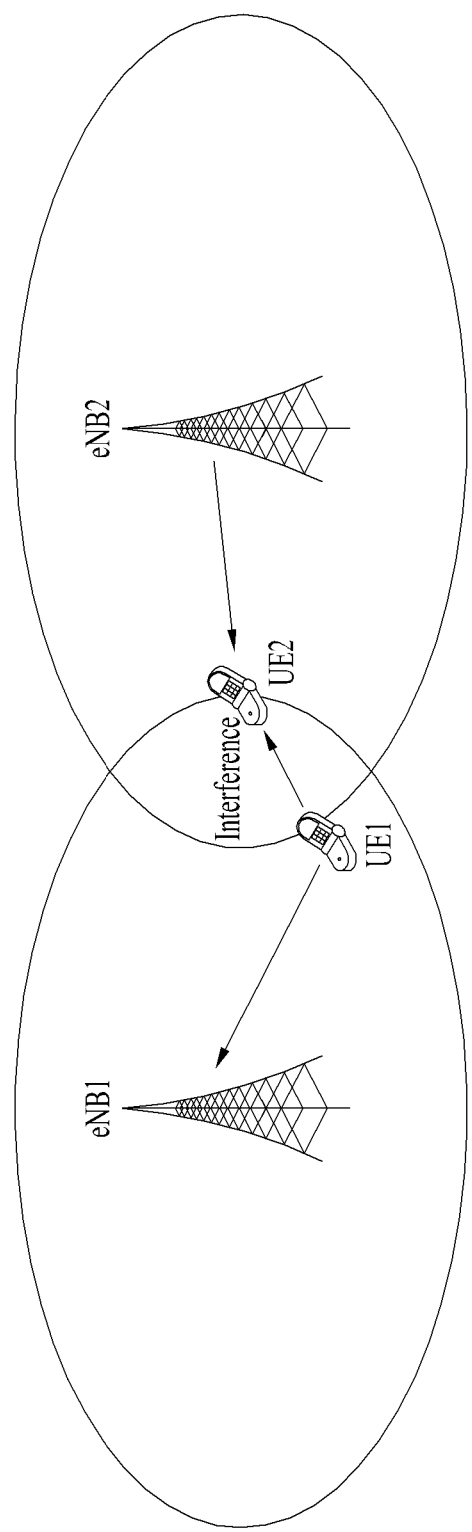
FIG. 7 is a diagram for one example of a case that uplink and downlink transmissions between neighbor cells collide with each other.

FIG. 7 is a diagram for one example of a case that uplink and downlink transmissions between neighbor cells collide with each other.

Referring to FIG. 7, assume that a cell (i.e., a $1^{st}$ cell) of an eNB 1 and a cell (i.e., a $2^{nd}$ cell) of an eNB 2 use the same frequency band. And, assume that a UL transmission and a DL transmission are performed in the $1^{st}$ cell and the $2^{nd}$ cell, respectively. In this case, the UL transmission to the $1^{st}$ cell by a UE 1 directly affects the DL transmission to a UE 2 from the $2^{nd}$ cell.

In order to reduce the above-mentioned interference, the present invention proposes a method of restricting a resource, which is used to perform UL and DL transmissions of each cell, in a frequency domain. In particular, the present invention proposes a method of reducing influence on UL and DL transmissions of a UE located at a counter cell edge in a manner of restricting a frequency region for performing actual UL and DL transmissions of UEs considerably affected by a UE located at a cell edge within the same bandwidth (or an inter-cell overlapped frequency region) or a neighbor cell.

Figure 8:
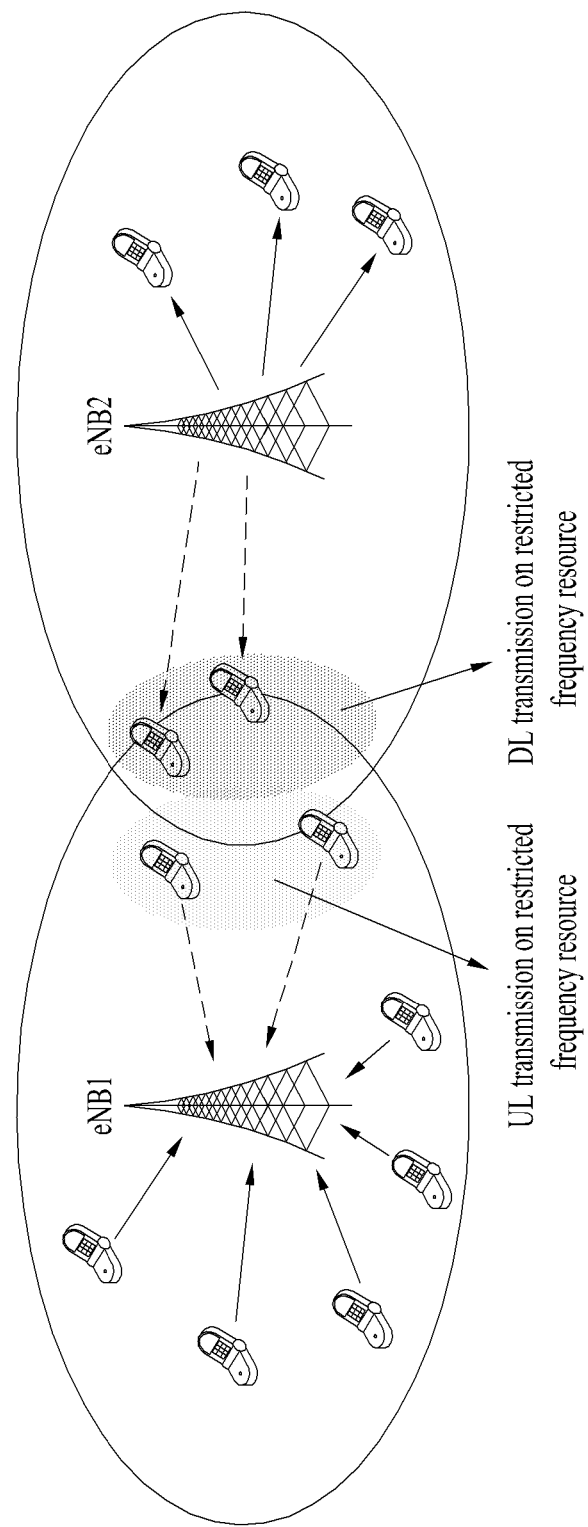
FIG. 8 is a diagram for one example of performing a resource-restricted transmission according to an embodiment of the present invention.

FIG. 8 is a diagram for one example of performing a resource-restricted transmission according to an embodiment of the present invention.

Referring to FIG. 8, if a difference between a serving cell and a neighbor cell in RSRP (reference signal received power) or RSRQ (reference signal received quality) reported from UEs in a cell is smaller than a preset threshold, each eNB is proposed to define the corresponding UE as a cell edge UE between the serving cell and the neighbor cell.

In this case, the threshold may be set smaller than an RSRP (or RSRQ) difference which becomes a reference of a handover. In particular, if a signal strength of the neighbor cell increases greater than a signal strength of the serving cell by a predetermined numerical value, the handover can be performed. Yet, in case of applying the present invention, a cell edge UE detection can be performed in a range in which a relative signal strength of the neighbor cell is smaller than a neighbor cell signal strength necessary for the handover.

Thereafter, the eNB of each of the cells detects a UE (i.e., the cell edge UE) greatly affected by the neighbor cell from the corresponding cell and is then able to apply a frequency resource restriction scheme to selected UEs.

Figure 9:
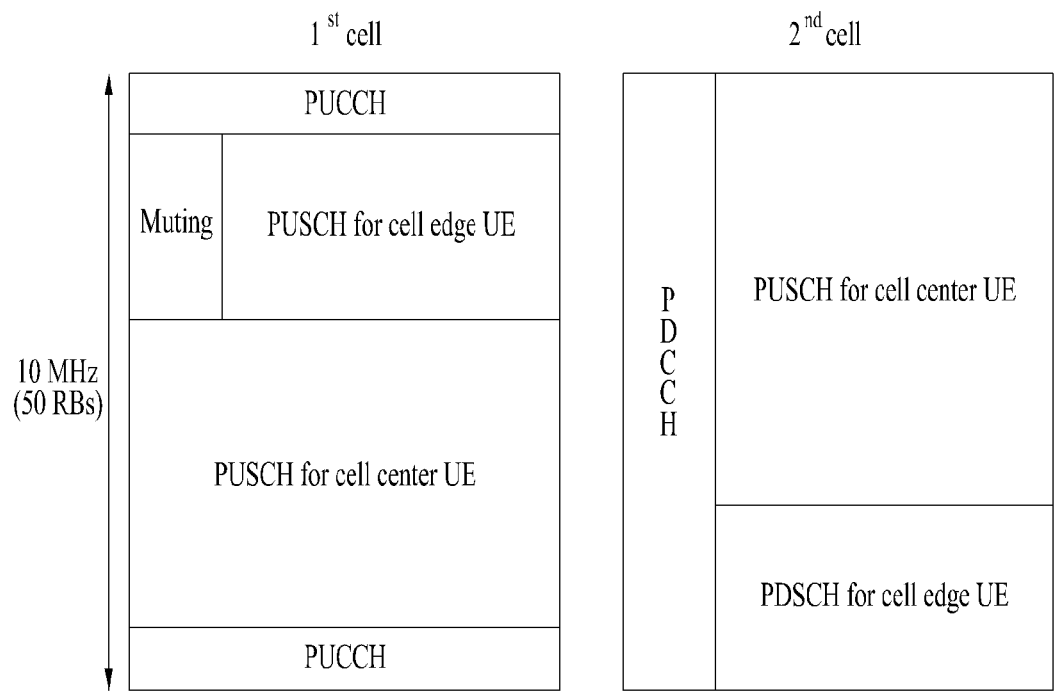
FIG. 9 is a diagram for one example of a frequency resource restriction scheme according to an embodiment of the present invention.

FIG. 9 is a diagram for one example of a frequency resource restriction scheme according to an embodiment of the present invention. Particularly, in FIG. 9, assume that a $1^{st}$ cell and a $2^{nd}$ cell perform UL or DL transmissions using a bandwidth of 10 MHz (i.e., 50 RBs). And, assume that the UL transmission of the $1^{st}$ cell and the DL transmission of the $2^{nd}$ cell are performed in the same subframe.

(1) A method for a cell edge UE of a $1^{st}$ cell to perform a UL transmission is described as follows.

First of all, a $1^{st}$ cell selects a cell edge UE and is then able to restrict UL transmissions to be performed by corresponding UEs in a partial region of a full band. In doing so, since it is difficult for OFDM symbols, which are used for PDCCH transmission by a $2^{nd}$ cell in a DL transmission, to be restricted to a specific UE within the $2^{nd}$ cell, the $1^{st}$ cell is proposed to reduce an interference influx into a PDCCH region of the $2^{nd}$ cell by sending the cell edge UE of the $1^{st}$ cell a signaling for instructing the cell edge UE to mute the OFDM symbols corresponding to PDCCH of the $2^{nd}$ cell. In this case, the 'mute' means that a corresponding resource region is not allocated as a resource for a UL transmission. Alternatively, the 'mute' means that a UE does not map an information corresponding to a prescribed resource region to OFDM symbol despite allocating the corresponding resource region as a resource for a UL transmission. Through this, the PDCCH region of the $2^{nd}$ cell can avoid experiencing the interference caused by a UL transmission from a UE 1.

By one of a method of decoding PCFICH of the $2^{nd}$ cell, a method of signaling through an X2 interface and the like, the $1^{st}$ cell can acquire the number of OFDM symbols used for the PDCCH transmission in the $2^{nd}$ cell. Alternatively, the $2^{nd}$ cell may deliver the number of symbols used for the PDCCH transmission in the $2^{nd}$ cell to the $1^{st}$ cell through the X2 interface or the like. Moreover, the $1^{st}$ cell can inform UEs, which apply the frequency resource restriction scheme to a UL transmission, of a region usable by the corresponding UE for the UL transmission [Resource restriction in aspect of frequency resource] and the number of OFDM symbols to be muted [Resource restriction in aspect of time resource] using RRC signaling or the like. Moreover, the corresponding UEs may not perform a UL transmission in the corresponding symbol by performing a rate matching, a puncturing or the like on the muted region.

(2) A DL transmission in a $2^{nd}$ cell is described as follows.

First of all, a $2^{nd}$ cell receives a signaling of information on a frequency resource used for a UL transmission by a cell edge UE of the $1^{st}$ cell from the $1^{st}$ cell through an X2 interface and preferably allocates the rest part except the corresponding region entirely or in part as a resource for a DL transmission to a cell edge UE of the $2^{nd}$ cell. In doing so, separately from a bandwidth signaled through MIB (master information block), a bandwidth assigned for cell edge UEs can be implemented in a manner that a frequency resource actually allocated to a UE within a corresponding bandwidth is separately signaled to the UE through an RRC layer or the like. In doing so, PDCCH can be transmitted across the full bandwidth transmitted through MIB, as shown in FIG. 9.

(3) Although the above description proposes that the $1^{st}$ cell (e.g., eNB of a cell for performing a UL transmission) signals a frequency resource, on which the cell edge UE of the $1^{st}$ cell performs a UL transmission, to the $2^{nd}$ cell (e.g., eNB of a cell for performing a DL transmission), it is apparent that an opposite case is possible. In particular, the $2^{nd}$ cell signals a resource region, in which a DL transmission to the cell edge UE of the $2^{nd}$ cell is performed, is signaled to the $1^{st}$ cell through the X2 interface. And, the $1^{st}$ cell can allocate a portion or whole part of the frequency resource except the corresponding region as a resource for a UL transmission to the cell edge UE of the $1^{st}$ cell.

(4) In case that a frequency resource used by a cell edge UE is additionally restricted, the present invention proposes a method of decreasing the number of bits required for a currently used DL control information (i.e., DCI (downlink control information) format of 3GPP LTE standard). Currently, most of the DCI format is used as a bitmap for resource allocation. In doing so, the number of used bits varies depending on the number of RBs corresponding to a DL bandwidth or a UL bandwidth. For instance, the number of RBs corresponding to a bandwidth is currently defined as 6 RBs for 1.4 MHz, 15 RBs for 3 MHz, 25 RBs for 5 MHz, 50 RBs for 10 MHz, 75 RBs for 15 MHz, 100 RBs for 20 MHz or the like.

Therefore, in case of applying the above-proposed resource restriction scheme, the present invention proposes to restrict a frequency resource by a scheme (a) or a scheme (b) in the following.

(a) First of all, it is able to consider a scheme of notifying an information (i.e., the number and location of actually available RB(s), etc.) on a prescribed number of RB(s) smaller than a bandwidth (hereinafter named a default bandwidth, for clarity of the following description) signaled through MIB as well as the default bandwidth by RRC signaling and then adjusting the bit number of a resource allocation field of DCI format to correspond to the signaled RB number. In this case, for clarity of the following description, the additionally RRC signaled RB information shall be named an assigned bandwidth.

For instance, when the bit number of the resource allocation field is determined as $N^{DL}_{RB}/P$ (where, P indicates a size of RBG (resource block group), i.e., the number of RBs configuring one RBG), if a default bandwidth signaled through MIB is 50 RBs and an assigned bandwidth signaled through RRC layer, i.e., the number of actually used RBs is 20, the bit number of the resource allocation field of the DCI format can be reduced to 10 bits from 17 bits (yet, assume that P=3 if 50 RBs or that P=2 if 20 RBs).

(b) Secondly, it is able to consider a scheme of restricting an assigned bandwidth, i.e., the number of RBs, to a previously defined bandwidth by being smaller than a default bandwidth signaled through MIB. Of course, information on a location of an actually used assigned bandwidth may need a separate signaling.

For instance, if a default bandwidth signaled through MIB is 50 RBs and an assigned bandwidth signaled through RRC layer, i.e., the number of actually used RBs, is 15 RBs (i.e., a default bandwidth signaled through MIB is 10 MHz and an assigned bandwidth signaled through RRC layer is 32 MHz), the bit number of the resource allocation field of the DCI format can be reduced to 8 bits from 17 bits.

Using the above-described scheme (a) or the above-described scheme (b), the bit number of the DCI format can be reduced, whereby PDCCH reliance can be increased in a manner of raising an aggregation level or a coding gain.

Figure 10:
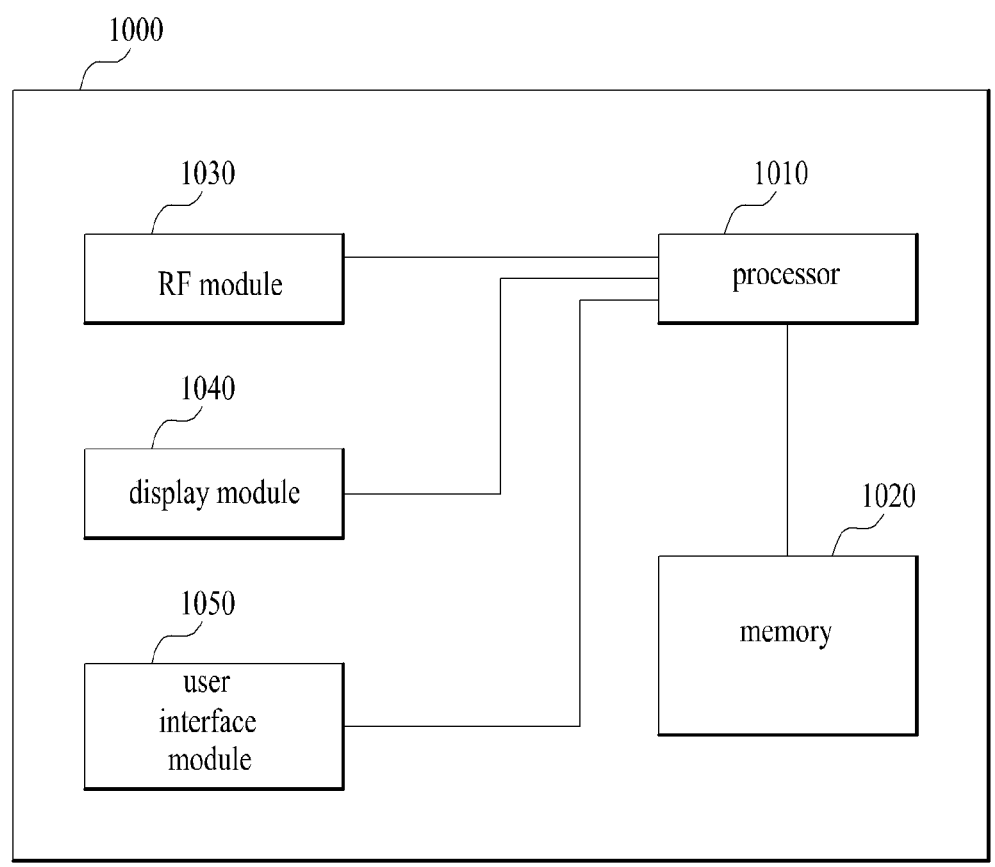
FIG. 10 is a block diagram for one example of a communication device according to one embodiment of the present invention.

FIG. 10 is a block diagram for one example of a communication device according to one embodiment of the present invention.

Referring to FIG. 10, a communication device 1000 includes a processor 1010, a memory 1020, an RF module 1030, a display module 1040 and a user interface module 1050.

The communication device 1000 is illustrated for clarity and convenience of the description and some modules can be omitted. Moreover, the communication device 1000 is able to further include at least one necessary module. And, some modules of the communication device 1000 can be further divided into sub-modules. The processor 1010 is configured to perform operations according to the embodiment of the present invention exemplarily described with reference to the accompanying drawings. In particular, the detailed operations of the processor 1010 can refer to the contents described with reference to FIGS. 1 to 9.

The memory 1020 is connected to the processor 1010 and stores operating systems, applications, program codes, data and the like. The RF module 1030 is connected to the processor 1010 and performs a function of converting a baseband signal to a radio signal or converting a radio signal to a baseband signal. For this, the RF module 1030 performs analog conversion, amplification, filtering and frequency uplink transform or inverse processes thereof. The display module 104Q is connected to the processor 1010 and displays various kinds of informations. The display module 1040 can include such a well-known element as LCD (Liquid Crystal Display), LED (Light Emitting Diode), PLED (Organic Light Emitting Diode) and the like, by which the present invention is non-limited. The user interface module 1050 is connected to the processor 1010 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that the combined claims can be included as new claims by revision after filing an application.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transceiving signals for alleviating inter-cell interference in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of transceiving a signal, which is transceived with a serving cell by a user equipment in a wireless communication system, the method comprising:
   receiving, by the user equipment, information on a default bandwidth, information on an assigned bandwidth and information on a subframe for transmitting an uplink signal, from the serving cell;
   receiving, by the user equipment, information on a number of at least one orthogonal frequency division multiplexing (OFDM) symbol on which a physical downlink control channel (PDCCH) is transmitted in the subframe by a neighboring cell, from the serving cell;
   when the user equipment is located at a cell center, transmitting, by the user equipment to the serving cell, the uplink signal using the subframe and the default bandwidth; and
   when the user equipment is located at a cell edge, transmitting, by the user equipment to the serving cell, the uplink signal using OFDM symbols, other than the at least one OFDM symbol in the subframe, and the assigned bandwidth, wherein the OFDM symbols other than the at least one OFDM symbol are determined based on the information on the number of the at least one OFDM symbol,
   wherein the at least one OFDM symbol is muted when the uplink signal is transmitted by the user equipment which is located at the cell edge, and
   wherein the assigned bandwidth is smaller than the default bandwidth.

2. The method of claim 1, wherein the assigned bandwidth defines a resource for an uplink signal transmission of the user equipment located at the cell edge or a resource for a downlink signal reception of the user equipment located at the cell edge.

3. The method of claim 1, wherein the information on the default bandwidth is received through a master information block (MIB) transmitted from the serving cell and wherein the information on the assigned bandwidth is received through a radio resource control (RRC) layer from the serving cell.

4. The method of claim 1, wherein the serving cell delivers the information on the assigned bandwidth to the neighboring cell through an X2 interface.

5. The method of claim 1, wherein the information on the assigned bandwidth comprises information on a number of resource block(s) and a location of the resource block(s) on a frequency.

6. In a wireless communication system, a user equipment comprising:
   a transceiver configured to transmit an uplink signal; and
   a processor configured to control the transceiver to:
     receive information on a default bandwidth, information on an assigned bandwidth from a serving cell and information on a subframe for transmitting the uplink signal,
     receive information on a number of at least one orthogonal frequency division multiplexing (OFDM) symbol on which a physical downlink control channel (PDCCH) is transmitted in the subframe by a neighboring cell, from the serving cell,
     when the user equipment is located at a cell center, transmit to the serving cell, the uplink signal using the subframe and the default bandwidth, and
     when the user equipment is located at a cell edge, transmit the serving cell, the uplink signal using OFDM symbols, other than the at least one OFDM symbol in the subframe, and the assigned bandwidth,
     wherein the OFDM symbols other than the at least one OFDM symbol are determined based on the information on the number of the at least one OFDM symbol,
   wherein the at least one OFDM symbol is muted when the uplink signal is transmitted by the user equipment which is located at the cell edge, and
   wherein the assigned bandwidth is smaller than the default bandwidth.

7. The user equipment of claim 6, wherein the assigned bandwidth defines a resource for an uplink signal transmission of the user equipment located at the cell edge or a resource for a downlink signal reception of the user equipment located at the cell edge.

8. The user equipment of claim 6, wherein the processor controls the transceiver to receive the information on the default bandwidth through a master information block (MIB) transmitted from the serving cell and wherein the transceiver receives the information on the assigned bandwidth through a radio resource control (RRC) layer from the serving cell.

9. The user equipment of claim 6, wherein the serving cell delivers the information on the assigned bandwidth to the neighboring cell through an X2 interface.

10. The user equipment of claim 6, wherein the information on the assigned bandwidth comprises information on a number and location of resource block(s).

* * * * *